Patented Nov. 6, 1934

UNITED STATES PATENT OFFICE 1,979,913

CHROMIFEROUS AZO-DYESTUFFS AND PROCESS OF MAKING SAME

Fritz Straub, Basel, and Hermann Schneider, Riehen, near Basel, Switzerland, assignors to Society of Chemical Industry in Basle, Basel, Switzerland No Drawing. Application November 6, 1933, Serial No. 696,917. In Switzerland November 8, 1932

12 Claims. (Cl. 260—12)

The invention relates to the manufacture of new chromiferous azo-dyestuffs by causing to react in an alkaline medium a chromiferous azo-dyestuff on the same azo-dyestuff which is free from chromium and contains at least once the residue of a coupling component whose coupling carbon atom belongs to a six-membered carbon ring. The dyestuffs serving as the parent materials for the manufacture may be either mono- azo-dyestuffs or poly-azo-dyestuffs; they may be made by various combinations of diazotized ortho-aminophenols, ortho-aminonaphthols, or of diazotized ortho-aminobenzene-carboxylic acids or ortho-aminonaphthalene-carboxylic acids, or diazotized amines which contain a salicylic acid grouping, as well as of various further substitution products of these amines, for example their sulfonic acids, nitro-derivatives, halogen-derivatives or alkoxy-derivatives; the one and only condition is that the mono- or poly-azo-dyestuff produced must contain at least once the residue of a coupling component, the coupling carbon atom of which is a member of a six-membered carbon ring.

The dyestuffs thus made on the one hand as such and on the other hand in the form of their chromium compounds, serve as the parent materials for this invention. The chromium compounds can be made from the chrome-free azo-dyestuffs by various known processes and with various chroming agents; such processes are, for example, chroming with an agent yielding chromium in an acid, neutral or alkaline medium, with or without application of pressure, in the presence or absence of a suitable addition, such as an inorganic or an organic acid or a soluble salt thereof, or another substance, for instance an organic solvent.

The medium in which the reaction between the chromiferous azo-dyestuff and the same dyestuff free from chromium is to occur may contain various substances of alkaline action, for example, sodium carbonate, potassium carbonate, borax, magnesium oxide, calcium oxide, ammonia, trialkali-metal phosphate, caustic alkali, such as potassium or sodium hydroxide, as well as organic bases, and these alkaline substances may be used alone or intermixed. Especially good results in respect of the dyeing properties of the chromiferous azo-dyestuffs obtained by the invention are, however, secured when the medium used contains caustic alkali.

The reaction of the chromiferous azo-dyestuff on the same azo-dyestuff free from chromium may occur under various conditions, for example under atmospheric pressure or at a raised pressure, in presence or absence of a suitable addition, such as a soluble inorganic or organic salt or other substance, for example an organic solvent. Moreover, the proportions between the chromiferous dyestuff and the chrome-free dyestuff may vary within wide limits.

The invention makes it possible to produce chromiferous azo-dyestuffs from those chromiferous azo-dyestuffs and chrome-free azo-dyestuffs which, in consequence of the lack of sulfonic acid groups or carboxylic acid groups, or for other reasons are sparingly soluble or insoluble; such dyestuffs cannot be converted, or can be converted only incompletely, into the new chromiferous azo-dyestuffs in acid or neutral medium. Moreover, the new chromiferous azo-dyestuffs are characterized, when compared with the dyestuffs obtained by treating chromiferous azo-dyestuffs with the same azo-dyestuffs free from chromium in an acid or neutral medium, by more favorable dyeing properties and in respect of solubility, levelling power, color strength, tint and fastness.

Particularly valuable new chromiferous azo-dyestuffs are obtained by causing chromiferous ortho-hydroxymonoazo-dyestuffs to react in an alkaline medium with the same ortho-hydroxymonoazo-dyestuffs but which are free from chromium and are obtained by coupling diazotized ortho-hydroxyaminonaphthalene-sulfonic acids with hydroxynaphthalenes. The chromiferous azo-dyestuffs thus obtained dye the animal fiber very valuable particularly navy blue to black tints.

The chromiferous azo-dyestuffs obtained by the process of this invention are preferably applied in accordance with the process described in Patent 1,903,884 or from a dye-bath containing aromatic acids besides mineral acid, and when so applied they dye very varied tints; they may be used for dyeing materials of any kind, such as wool, loaded and unloaded silk, leather, cotton, artificial silk made from regenerated cellulose, cellulose ethers, cellulose esters, varnishes made with a basis of cellulose or natural or artificial resin; or as pigments or in printing.

The following examples illustrate the invention, the parts being by weight:—

Example 1

83.2 parts of the azo-dyestuff of the formula

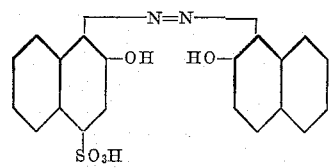

obtained by coupling diazotized 1-amino-2-hydroxynaphthalene-4-sulfonic acid with 2-hydroxynaphthalene, in the form of its sodium salt, are suspended in 1600 parts of water and the suspension is mixed with a solution of chromium formate corresponding with 16.7 parts of Cr₂O₃ and then boiled for 9 hours in a reflux apparatus. It is then made alkaline with 200 parts of caustic soda solution of 30 per cent. strength; there are now added a further 27.7 parts of the same azo-dyestuff, but free from chromium, and the whole is boiled for 3 hours. After cooling to 50–60° C. the mass is neutralized with hydrochloric acid of 10 per cent. strength and made acid to litmus by adding a small proportion of formic acid. After filtration from a small quantity of impurities the liquid is evaporated to dryness in a vacuum.

The new chromiferous azo-dyestuff which represents a violet-black power is thus obtained in the form of a product freely soluble in water to a blue solution which dyes wool in an acid bath marine blue tints of excellent fastness.

*Example 2*

92.2 parts of the azo-dyestuff of the formula

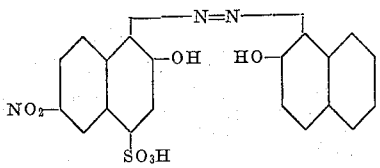

obtained by coupling nitrated 1-diazo-2-hydroxynaphthalene-4-sulfonic acid with 2-hydroxynaphthalene are suspended in 2000 parts of water; after addition of chromium formate corresponding with 18.2 parts of Cr₂O₃, the mixture is boiled in a reflux apparatus for 8 hours. The insoluble greenish-black chromium compound thus produced is isolated by filtration and then stirred into 1600 parts of water together with 45 parts of the said azo-dyestuff free from chromium. There are then added 200 parts of caustic soda solution of 30 per cent. strength and the whole is boiled in a reflux apparatus for 4 hours. The violet-black solution thus obtained is cooled to 50–60° C. and neutralized with hydrochloric acid of 10 per cent. strength and then rendered feebly acid to litmus by adding 3 parts of formic acid of 85 per cent. strength. Evaporation to dryness in a vacuum follows. The new chromiferous azo-dyestuff thus obtained dissolves freely in water to a violet black solution. It dyes wool in an acid bath black shades of surprising fastness.

*Example 3*

65 parts of the chromiferous azo-dyestuff made with use of potassium chromite as the chroming agent from the azo-dyestuff of the formula

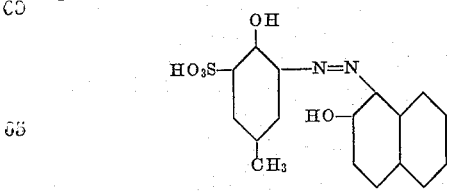

obtained by coupling diazotized 2-amino-1-hydroxy-4-methylbenzene-6-sulfonic acid with 2-hydroxynaphthalene are suspended in 800 parts of water together with 22 parts of the same azo-dyestuff free from chromium. By adding 110 parts of caustic soda solution of 30 per cent. strength, the dyestuff is dissolved, whereupon the mixture is boiled for 5 hours in a reflux apparatus. The violet solution of the new chromiferous dyestuff thus produced is diluted to about 1200 parts with water and filtered from small portions of impurities; the filtrate is neutralized cautiously with mineral acid of 10 per cent. strength and the dyestuff salted out.

It dyes wool in a bath containing an organic acid and sulfuric acid violet tints of excellent fastness.

*Example 4*

The chromiferous azo-dyestuff made by chroming with chromium formate 39.5 parts of the azo-dyestuff of the formula

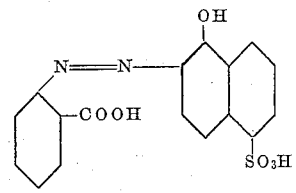

obtained by coupling diazotized 1-aminobenzene-2-carboxylic acid with 1-hydroxynaphthalene-5-sulfonic acid and 20 parts of the same azo-dyestuff free from chromium are introduced into a solution of 60 parts of potassium hydroxide of 90 per cent. strength in 600 parts of water. When dissolution of the dyestuff is complete, the solution is heated for 4–5 hours in a reflux apparatus and then the brown red solution thus formed is diluted with about 400 parts of water and filtered from small proportions of impurities. The filtrate is neutralized with strongly diluted mineral acid and then evaporated to dryness in a vacuum.

The chromiferous dyestuff thus obtained is a brownish powder, freely soluble in water; it dyes wool in an acid bath brownish-red tints of very good fastness.

*Example 5*

60 parts of the chromiferous azo-dyestuff obtained by chroming in acid medium the azo-dyestuff of the formula

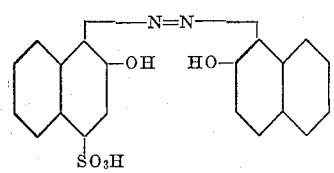

obtained by coupling diazotized 1-amino-2-hydroxynaphthalene-4-sulfonic acid with 2-hydroxynaphthalene and 20.8 parts of the same azo-dyestuff free from chromium, are suspended in 700 parts of water; 100 parts of ammonia solution of 25 per cent. strength are added and the whole is heated in a closed vessel for 4–5 hours at 100–105° C. The black-blue solution thus obtained is diluted with water to about 1000 parts, separated from some chromium mud by filtration, and the new chromiferous dyestuff is precipitated from the filtrate by addition of common salt and neutralizing the ammonia with acid. It is washed with some common salt solution on the filter and dried. It is a violet-black powder, freely soluble in water.

It dyes wool in an acid bath marine blue tints of outstanding fastness.

*Example 6*

6 parts of the chromiferous azo-dyestuff, made by chroming with chromium formate the dyestuff of the formula

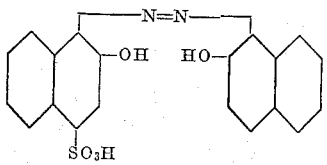

obtained by coupling diazotized 1-amino-2-hydroxynaphthalene-4-sulfonic acid with 2-hydroxynaphthalene, are dissolved in 80 parts of water which contain 3.6 parts of tetramethylammonium-hydroxide and to this solution there are added 3.12 parts of the same azo-dyestuff which has not been chromed. The whole is then boiled for 3-4 hours in a reflux apparatus. After neutralization with strongly diluted hydrochloric acid, the blackish-blue solution thus obtained yields the new dyestuff on the addition of common salt.

It dissolves very freely in water and dyes wool in an acid bath marine blue tints of excellent fastness.

*Example 7*

42 parts of the chromiferous azo-dyestuff made by chroming in acid medium the azo-dyestuff of the formula

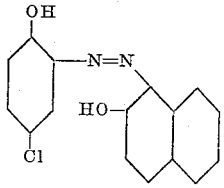

obtained by coupling diazotized 2-amino-4-chloro-1-hydroxybenzene with 2-hydroxynaphthalene, together with 15 parts of the same azo-dyestuff free from chromium, are dissolved in 400 parts of alcoholic potash solution of 20 per cent. strength. This solution is boiled in a reflux apparatus until no more dyestuff free from chromium can be detected. Then, after distillation of about half of the alcohol, the mass is diluted with 500 parts of common salt solution of 5 per cent. strength, and the chromiferous dyestuff thus precipitated is filtered. It is a brown powder which dyes wool in an acid bath violet tints of good fastness.

*Example 8*

10 parts of the complex chromium compound of the disazo-dyestuff of the formula

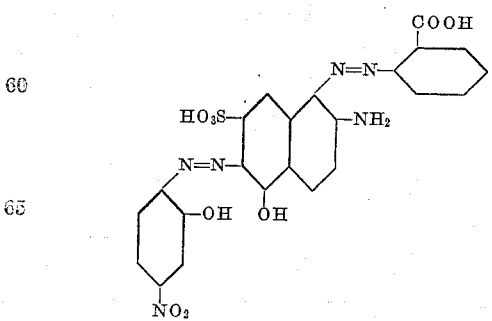

obtained by coupling diazotized 2-aminobenzoic acid in an acid medium with 2-amino-5-hydroxynaphthalene-7-sulfonic acid and subsequent coupling in an alkaline medium with diazotized 2-amino-5-nitro-1-hydroxybenzene, are dissolved in 300 parts of hot water with addition of 4 parts of caustic soda solution of 30 per cent. strength. A solution consisting of 1 part of the same dyestuff but free from chromium, 0.7 part of caustic soda solution of 30 per cent. strength, and 50 parts of water is then added, and the whole is boiled in a reflux apparatus for 12 hours. Thereupon the mixture is neutralized with acetic acid and the dyestuff salted out.

When dry it represents a dark powder which dissolves in water, dilute soda solution and caustic soda solution to a blue solution, in concentrated sulfuric acid to a muddy blue solution, and dyes cotton as well as artificial silk from regenerated cellulose in a bath containing Glauber's salt blue-grey tints.

*Example 9*

10 parts of the complex chromium compound of the disazo-dyestuff of the formula

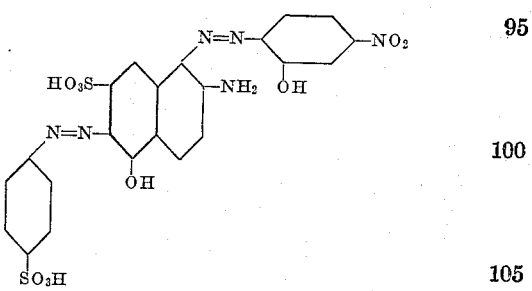

obtained by coupling diazotized 2-amino-5-nitro-1-hydroxybenzene in an acid medium with 2-amino-5-hydroxynaphthalene-7-sulfonic acid, and subsequent coupling in an alkaline medium with 4-aminobenzene sulfonic acid, are dissolved in 100 parts of water with addition of 1.4 parts of caustic soda solution of 30 per cent. strength. A solution consisting of 0.75 part of the same dyestuff but free from chromium, 0.4 part of caustic soda solution of 30 per cent. strength, and 30 parts of water is then added, and the whole is boiled in a reflux apparatus for 12 hours. After neutralization evaporation to dryness follows.

There is obtained a dark dyestuff powder which dissolves in water and dilute soda solution to a muddy red-violet solution, in dilute caustic soda solution to a muddy olive-green solution, and in concentrated sulfuric acid to a muddy red-brown solution, and dyes cotton as well as artificial silk from regenerated cellulose in a bath containing Glauber's salt reddish-grey tints.

*Example 10*

A complex chromium compound produced with chromium formate from 39.5 parts of the azo-dyestuff of the formula

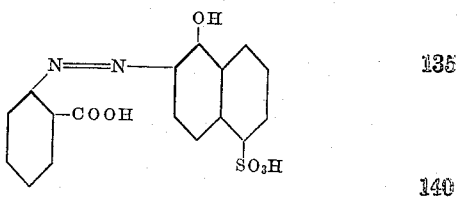

obtained by coupling diazotized 1-aminobenzene-2-carboxylic acid with 1-hydroxynaphthalene-5-sulfonic acid together with 20 parts of the same azo-dyestuff, but free from chromium, are introduced into a solution consisting of 60 parts of potassium hydroxide of 90 per cent. strength and 600 parts of water. After the dyestuffs have dissolved the whole is boiled in a reflux apparatus for 4-5 hours, whereupon the brown-red solution thus formed, after dilution with about 400 parts of water, is filtered in order to remove impurities, neutralized with strongly dilute mineral acid, and evaporated to dryness in a vacuum.

The new chromium compound is obtained as a brownish powder easily soluble in water, whose acidified red solution dyes wool brownish red tints of very good fastness properties.

Example 11

2 parts of the complex chromium compound of the azo-dyestuff of the formula

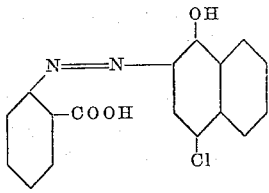

obtained by coupling diazotized 2-aminobenzoic acid with 1-hydroxy-4-chloronaphthalene, and 0.2 part of the same azo-dyestuff, but free from chromium, are dissolved or suspended in 500 parts of hot water with addition of 1.5 parts of caustic soda solution of 30 per cent. strength, and boiled for 12 hours. The precipitated dyestuff is then filtered off and dried.

The dyestuff, when dry, represents a dark-red powder which dissolves in caustic soda solution to a brownish-red solution, in concentrated sulfuric acid to a muddy grey solution, and dyes wool from a sulfuric acid bath violet-brown tints.

Example 12

2 parts of the chromium compound of the azo-dyestuff of the formula

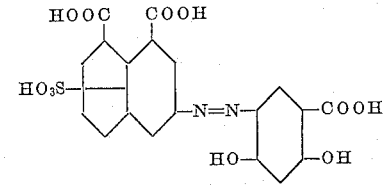

obtained by coupling diazotized sulfo-3-aminonaphthalene-1:8-dicarboxylic acid with 2:4-dihydroxybenzoic acid are dissolved in 100 parts of water while adding 1.5 parts of caustic soda solution of 30 per cent. strength, and, after addition of a solution consisting of 0.3 part of the same azo-dyestuff, but free from chromium, 0.4 part of caustic soda solution of 30 per cent. strength, and 50 parts of water, the whole is boiled for 12 hours. The chromium mud is filtered off and the filtrate evaporated to dryness on the water-bath.

The dyestuff represents a dark powder which dissolves in water and dilute soda solution to a brownish yellow solution, in caustic soda solution to a yellow-red solution, in concentrated sulfuric acid to a yellow-brown solution, and dyes wool from a sulfuric acid bath brownish red-yellow tints.

Example 13

5 parts of the chromium compound of the azo-dyestuff of the formula

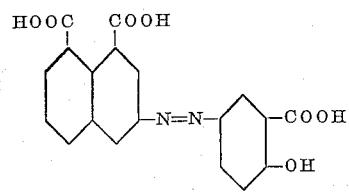

obtained by coupling diazotized 3-aminonaphthalene-1:8-dicarboxylic acid with 2-hydroxybenzoic acid are dissolved in 300 parts of water while adding 0.3 part of caustic soda solution of 30 per cent. strength, and, after addition of a solution consisting of 0.75 part of the same azo-dyestuff, but free from chromium, 0.7 part of caustic soda and 100 parts of water, the whole is boiled in a reflux apparatus for 12 hours. Neutralization with acetic acid and precipitation of the dyestuff by addition of common salt follow.

It represents, when dry, a brown powder which dissolves in dilute soda solution, caustic soda solution and concentrated sulfuric acid to a brown-yellow solution, and dyes wool from a sulfuric acid bath brownish-yellow tints.

Example 14

10 parts of the chromium compound of the azo-dyestuff of the formula

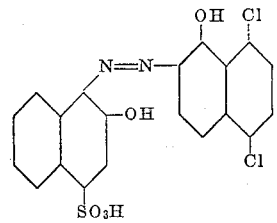

obtained by coupling diazotized 1-amino-2-hydroxynaphthalene-4-sulfonic acid with 5:8-dichloro-1-hydroxynaphthalene are dissolved in 400 parts of water while adding 5.5 parts of caustic soda solution of 30 per cent. strength, and, after addition of a solution consisting of 1.5 parts of the same azo-dyestuff, but free from chromium, 0.6 part of caustic soda solution of 30 per cent. strength, and 100 parts of water, the whole is boiled for 12 hours. The dyestuff is completely separated by addition of common salt and dried.

It represents, when dry, a dark powder which dissolves in water, soda solution and dilute caustic soda solution to a blue solution, and dyes wool from a sulfuric acid bath blue tints of excellent fastness properties.

Example 15

5 parts of the chromium compound of the azo-dyestuff of the formula

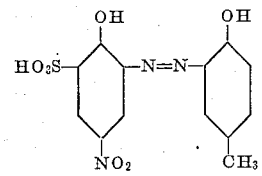

obtained by coupling diazotized 2-amino-4-nitro-1-hydroxybenzene-6-sulfonic acid with 4-methyl-1-hydroxybenzene and 0.75 part of the same azo-dyestuff free from chromium, are dissolved in 125 parts of hot water with addition of 2.5 parts of caustic soda solution of 30 per cent. strength, and boiled in a reflux apparatus for several hours. After neutralization with acetic acid the dyestuff is separated by addition of common salt.

It represents, when dry, a dark powder which dissolves in water and dilute alkalies to a brown solution and dyes wool from a sulfuric acid bath brown tints.

Example 16

19.5 parts of the chromium compound of the azo-dyestuff of the formula

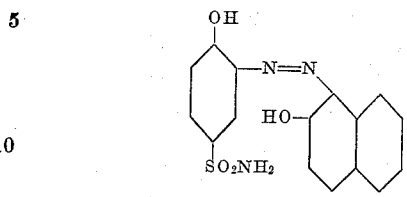

obtained by coupling diazotized 2-amino-1-phenol-4-sulfamide with 2-hydroxynaphthalene are heated to the boil with 1000 parts of water and 27 parts of caustic soda solution of 30 per cent. strength, and kept boiling in a reflux apparatus for 24 hours with 4.5 parts of the sodium salt of the same dyestuff free from chromium. After no more free sodium salt can be detected in the solution, the dyestuff is separated by acidifying with dilute formic acid. After filtering, washing out and drying there is obtained a blue-black powder which dissolves in water to a brown tinged violet solution, in soda solution of caustic soda solution to a violet solution, and in concentrated sulfuric acid also to a violet solution. From a solution in nitrocellulose lacquer there are obtained brown tinged violet coatings on suitable substrata.

Example 17

65 parts of a chromium compound, obtained by chroming with potassium chromite, of the azo-dyestuff of the formula

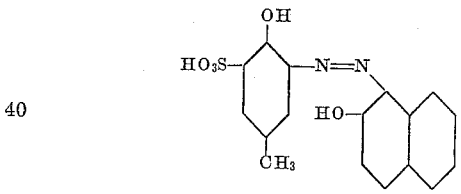

obtained by coupling diazotized 2-amino-1-hydroxy-4-methylbenzene-6-sulfonic acid with 2-hydroxynaphthalene are suspended in 800 parts of water together with 22 parts of the same azo-dyestuff free from chromium, brought into solution by adding 110 parts of a caustic soda solution of 30 per cent. strength, and boiled in a reflux apparatus for 5 hours. The violet solution of the new chromium compound thus formed is diluted with water to about 1200 parts, filtered from small impurities, cautiously made neutral with mineral acid of 10 per cent. strength, and the dyestuff separated by addition of common salt.

It dyes wool in a bath containing an organic acid and sulfuric acid violet tints of excellent fastness properties.

What we claim is:—

1. Process for the manufacture of chromiferous azo-dyestuffs by causing chromiferous azo-dyestuffs to react on the same azo-dyestuffs, but free from chromium, containing at least once the radical of a coupling component whose coupling carbon atom belongs to a six-membered carbon ring, consisting in conducting the reaction in an alkaline medium.

2. Process for the manufacture of chromiferous azo-dyestuffs by causing chromiferous ortho-hydroxy-azo-dyestuffs to react on the same ortho-hydroxy-azo-dyestuffs, but free from chromium, containing at least once the radical of a coupling component whose coupling carbon atom belongs to a six-membered carbon ring, consisting in conducting the reaction in an alkaline medium.

3. Process for the manufacture of chromiferous azo-dyestuffs by causing chromiferous ortho-hydroxy-mono-azo-dyestuffs to react on the same ortho-hydroxy-mono-azo-dyestuffs, but free from chromium, containing the radical of a coupling component whose coupling carbon atom belongs to a six-membered carbon ring, consisting in conducting the reaction in an alkaline medium.

4. Process for the manufacture of chromiferous azo-dyestuffs by causing chromiferous ortho-hydroxy-mono-azo-dyestuffs to react on the same ortho-hydroxy-mono-azo-dyestuffs, but free from chromium, obtained by coupling diazotized ortho-hydroxyamino-naphthalene sulfonic acids with hydroxynaphthalenes, consisting in conducting the reaction in an alkaline medium.

5. Process for the manufacture of chromiferous azo-dyestuffs by causing chromiferous ortho-hydroxy-mono-azo-dyestuffs to react on the same ortho-hydroxy-mono-azo-dyestuffs, but free from chromium, obtained by coupling diazotized ortho-hydroxyaminonaphthalene sulfonic acids with hydroxynaphthalenes, consisting in conducting the reaction in presence of a caustic alkali.

6. Process for the manufacture of a chromiferous azo-dyestuff by causing the chromiferous ortho-hydroxy-mono-azo-dyestuff from the ortho-hydroxy-mono-azo-dyestuff of the formula

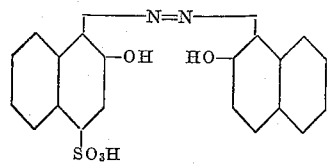

to react on the same ortho-hydroxy-mono-azo-dyestuff, consisting in conducting the reaction in presence of a caustic alkali.

7. Chromiferous azo-dyestuffs which are formed in an alkaline medium by the reaction of chromiferous azo-dyestuffs on the same azo-dyestuffs, but free from chromium, containing at least once the radical of a coupling component whose coupling carbon atom belongs to a six-membered carbon ring, which products represent brown to red to black powders dissolving in water to yellow to brown to violet to blue to black solutions, and dyeing materials yellow to brown to red to violet to blue to grey to black tints.

8. Chromiferous azo-dyestuffs which are formed in an alkaline medium by the reaction of chromiferous ortho-hydroxy-azo-dyestuffs on the same ortho-hydroxy-azo-dyestuffs, but free from chromium, containing at least once the radical of a coupling component whose coupling carbon atom belongs to a six-membered carbon ring, which products represent brown to red to black powders dissolving in water to yellow to brown to violet to blue to black solutions, and dyeing materials yellow to brown to red to violet to blue to grey to black tints.

9. Chromiferous azo-dyestuffs which are formed in an alkaline medium by the reaction of chromiferous ortho-hydroxy-mono-azo-dyestuffs on the same ortho-hydroxy-mono-azo-dyestuffs, but free from chromium, containing the radical of a coupling component whose coupling carbon atom belongs to a six-membered carbon ring, which products represent brown to red to black powders dissolving in water to yellow to brown to violet to blue to black solutions, and dyeing materials yellow to brown to red to violet to blue to grey to black tints.

10. Chromiferous azo-dyestuffs which are obtained in an alkaline medium by the reaction of chromiferous ortho-hydroxy-mono-azo-dyestuffs on the same ortho-hydroxy-mono-azo-dyestuffs obtained by coupling diazotized ortho-hydroxy-amino-naphthalene sulfonic acid with hydroxynaphthalenes, which products represent dark colored powders, dissolving in water to blue to black solutions, and dyeing animal fibers blue to black tints.

11. Chromiferous azo-dyestuffs which are obtained in presence of a caustic alkali by the reaction of chromiferous ortho-hydroxy-mono-azo-dyestuffs on the same ortho-hydroxy-mono-azo-dyestuffs obtained by coupling diazotized ortho-hydroxy-amino-naphthalene sulfonic acid with hydroxynaphthalenes, which products represent dark colored powders, dissolving in water to blue to black solutions, and dyeing animal fibers blue to black tints.

12. The chromiferous azo-dyestuff which is formed in presence of a caustic alkali by the reaction of the chromiferous ortho-hydroxy-mono-azo-dyestuff from the ortho-hydroxy-mono-azo-dyestuff of the formula

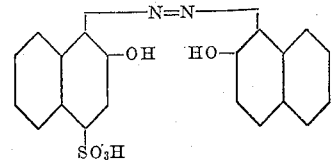

on the same ortho-hydroxy-mono-azo-dyestuff, which product represents a violet-black powder, dissolving in water to a blue solution, and dyeing the animal fiber navy blue tints.

FRITZ STRAUB.
HERMANN SCHNEIDER.